(12) United States Patent
Ouzounis et al.

(10) Patent No.: US 10,679,055 B2
(45) Date of Patent: Jun. 9, 2020

(54) ANOMALY DETECTION USING NON-TARGET CLUSTERING

(71) Applicant: DigitalGlobe, Inc., Westminster, CO (US)

(72) Inventors: Georgios Ouzounis, Longmont, CO (US); Kostas Stamatiou, Longmont, CO (US)

(73) Assignee: DIGITALGLOBE, INC., Westminster, CO (US)

(*) Notice: Subject to any disclaimer, the term of this patent is extended or adjusted under 35 U.S.C. 154(b) by 0 days.

(21) Appl. No.: 15/802,743

(22) Filed: Nov. 3, 2017

(65) Prior Publication Data
US 2018/0330190 A1    Nov. 15, 2018

Related U.S. Application Data

(60) Provisional application No. 62/505,074, filed on May 11, 2017.

(51) Int. Cl.
| | |
|---|---|
| *G06K 9/00* | (2006.01) |
| *G06T 7/00* | (2017.01) |
| *G06K 9/62* | (2006.01) |
| *G06T 7/90* | (2017.01) |
| *G06F 16/583* | (2019.01) |
| *G06T 7/12* | (2017.01) |
| *G06T 7/11* | (2017.01) |
| *G06K 9/40* | (2006.01) |

(52) U.S. Cl.
CPC ....... *G06K 9/0063* (2013.01); *G06F 16/5854* (2019.01); *G06K 9/00637* (2013.01); *G06K 9/627* (2013.01); *G06K 9/6215* (2013.01); *G06K 9/6219* (2013.01); *G06K 9/6221* (2013.01); *G06K 9/6242* (2013.01); *G06K 9/6267* (2013.01); *G06K 9/6282* (2013.01); *G06T 7/0002* (2013.01); *G06T 7/0004* (2013.01); *G06T 7/11* (2017.01); *G06T 7/12* (2017.01); *G06T 7/90* (2017.01); *G06K 9/40* (2013.01); *G06T 2207/10024* (2013.01); *G06T 2207/10036* (2013.01); *G06T 2207/30181* (2013.01); *G06T 2207/30184* (2013.01); *G06T 2207/30188* (2013.01)

(58) Field of Classification Search
USPC .................................. 382/141–152
See application file for complete search history.

(56) References Cited

U.S. PATENT DOCUMENTS

| | | | | |
|---|---|---|---|---|
| 5,815,198 | A * | 9/1998 | Vachtsevanos | G01N 21/88 348/125 |
| 2006/0045357 | A1* | 3/2006 | Schwartz | H04N 19/503 382/232 |
| 2007/0291994 | A1* | 12/2007 | Kelle | G01C 11/00 382/110 |
| 2016/0125621 | A1* | 5/2016 | Saitwal | G06K 9/38 382/165 |

* cited by examiner

*Primary Examiner* — Alex Kok S Liew
(74) *Attorney, Agent, or Firm* — Brian R. Galvin; Galvin Patent Law LLC

(57) ABSTRACT

A system and methods for radiometric anomaly detection using non-target clustering, wherein a hierarchy generator organizes the image information content into a hierarchical data representation structure, and a non-target clustering engine processes the hierarchical model to identify large homogeneous regions and significantly dissimilar smaller regions within them based on search criteria.

18 Claims, 9 Drawing Sheets

ANOMALY DETECTION USING NON-TARGET CLUSTERING

CROSS-REFERENCE TO RELATED APPLICATIONS

The present application claims the benefit of, and priority to, U.S. provisional patent application Ser. No. 62/505,074, titled "SHAPE-BASED SEGMENTATION USING HIERARCHICAL IMAGE REPRESENTATIONS FOR AUTOMATIC TRAINING DATA GENERATION AND SEARCH SPACE SPECIFICATION FOR MACHINE LEARNING ALGORITHMS", filed on May 11, 2017, the entire specification of which is incorporated herein by reference.

BACKGROUND

Field of the Art

The disclosure relates to the field of image processing, and more particularly to the field of identifying anomalies within an image space.

Discussion of the State of the Art

Anomaly detection is the identification of objects that do not conform to an expected spatial pattern within an image space. Anomalies may vary drastically in shape, size, radiometric signatures, or other qualities, and are traditionally extracted using a sliding-window approach that is costly in time and computing resources. To accomplish this process more efficiently, image information must be organized into a hierarchy of pixel groupings from fine to coarse using a defined connectivity criteria, and homogeneous regions may then be clustered and extracted based on a dissimilarity threshold. Then anomalies may be easily identified as "holes" within these clustered regions, comprising components that do not cluster with the defined region unless a very high dissimilarity threshold is set.

Thus what is needed, is an efficient means to define and compute an expected spatial pattern within an image space and then identify and differentiate anomalies that do not fit the pattern.

SUMMARY

Accordingly, the inventor has conceived and reduced to practice, a system and methods for anomaly detection using non-target clustering.

The aspects herein describe a system and methods for anomaly detection using non-target clustering, wherein a hierarchy generator organizes image information content into a hierarchical data representation structure hereafter referred to as the model, and a non-target clustering engine processes the hierarchical model to identify large homogeneous regions and smaller highly dissimilar regions within them based on search criteria.

According to one aspect, a system for anomaly detection using non-target clustering, comprising: a hierarchy generator comprising at least a plurality of programming instructions stored in a memory and operating on a processor of a computing device and configured to receive an image and to algorithmically process the image to produce a hierarchical image representation model of image information within the image; and a non-target clustering engine comprising at least a plurality of programming instructions stored in a memory and operating on a processor of a computing device and configured to process a hierarchical image representation model to identify large homogeneous regions hereafter referred to as the background region and a plurality of anomalies, the anomalies being based at least in part on defined search criteria, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
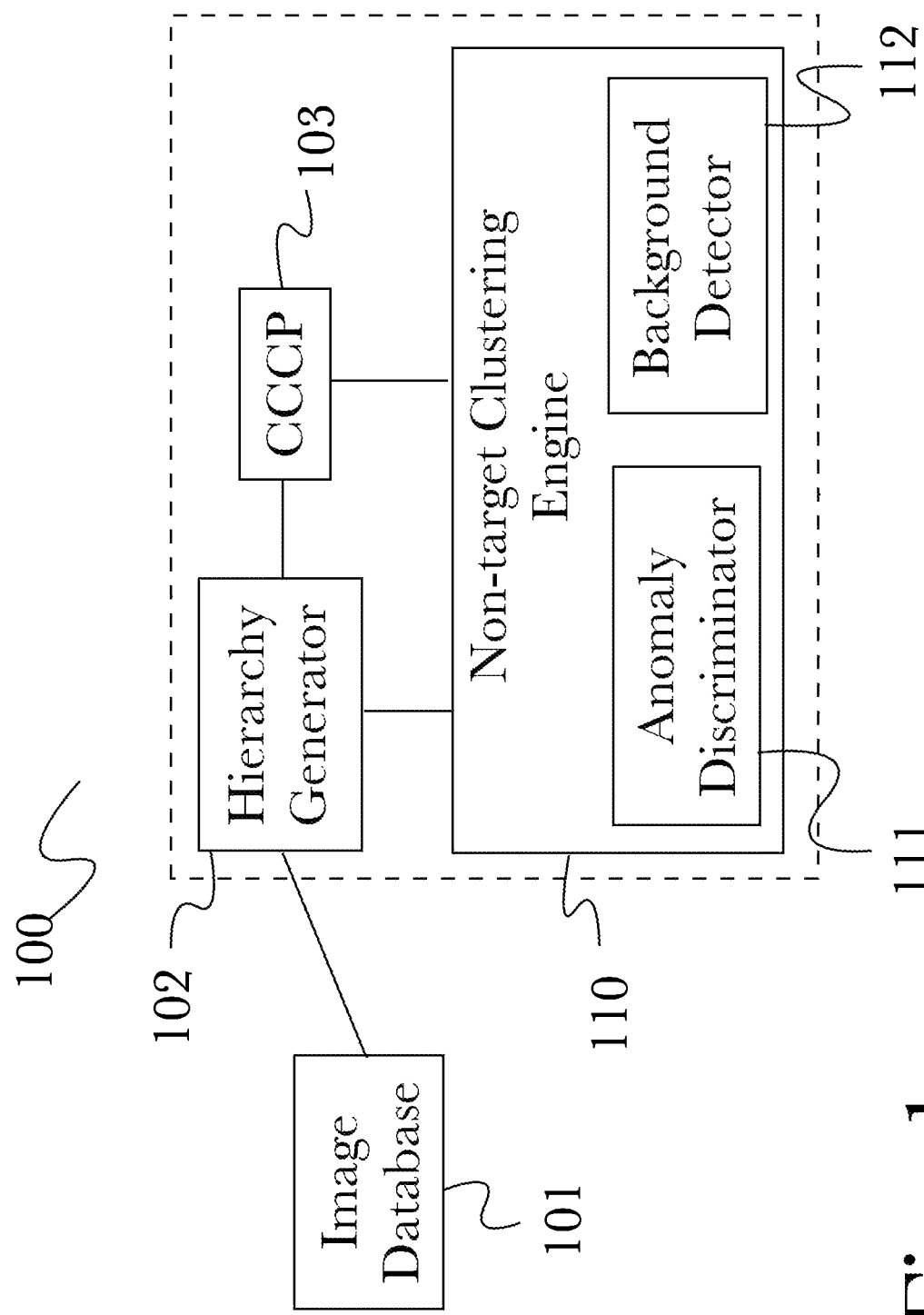
FIG. 1 is a block diagram illustrating an exemplary system architecture for anomaly detection using non-target clustering, according to one aspect.

The inventor has conceived, and reduced to practice, a system and methods for anomaly detection using non-target clustering.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for anomaly detection using non-target clustering, according to one aspect. According to the aspect, an image storage 101 may comprise a database or other data store that stores and provides images for use by a hierarchy generator 102 to produce a hierarchical image representations of retrieved images or model for each retrieved image, organizing image information into a hierarchy of pixel groupings using an alpha-tree modeling algorithm, as described below. Hierarchical models may then be used by a non-target clustering engine 110, which comprises a background region detector 111 that may recognize large homogeneous regions based on size and similarity, and an anomaly discriminator 112 that may recognize holes or irregularities in the background region which may indicate features of interest or image anomalies (and optionally, may be removed according to size criteria to avoid large image anomalies that may affect feature detection). A Constrained Connected Component Processor (CCCP) 103 may then process the hierarchical model to analyze anomalies according to search-based rules.

An Alpha-Tree data structure is a hierarchical model that may be used when processing an image, to organize image information into hierarchically nested image regions according to some dissimilarity metric. These regions also known as connected components, consist of elements linked to each other by arbitrary element paths, in any one of which, two adjacent members do not differ more than a given dissimilarity threshold value. A connected component is a connected set of maximal extent (that is, there is no other connected set that is a superset of it and adhering to the same connectivity rules between its elements) within the image space. A "flat zone" is a connected component consisting of pairwise iso-tone elements explicitly, and an image-space partition is its division into a set of non-overlapping cells (regions) the union of which covers the full extent of the image space. The set of all connected components for a given value of alpha defines a partition of the image space. The set of partitions computed for all possible alpha-values may be placed in a stack (low to high) from which only alpha-connected components (—CCs) that appear for the first time are retained, i.e. duplicates that may appear for higher values of alpha are discarded. This produces a rooted, unidirectional tree (hierarchical model) with node-to-parent association, wherein the leaves correspond to connected components of elements that are fully similar to each other according to some notion of similarity, and the root coincides with the —CC that maps to the image definition domain. This information structuring enables automated, high-speed, and consistent image information processing and offers efficient search and retrieve mechanisms.

Non-target clustering engine 110 may be used to process an Alpha-Tree. It first sets all tree nodes to an "accept" status. An accept decision (logical value) is stored in a binary array of entries that are as many as the number of tree nodes. The Non-target clustering then traverses through the data structure from the leaves towards the root. Each —CC at a level less than a predefined dissimilarity threshold that was previously of status "accept" and that fails to meet a pre-defined attribute threshold (based on the search being performed) is set to "reject" status. If a tree node is found within this range of alpha values that satisfies the attribute threshold, it retains its "accept" status while its parent node (found at an alpha value greater than) is set for rejection. This process propagates through the hierarchy until the dissimilarity threshold is reached. Beyond this, and until the root node, all other nodes in the path are rejected too. In a reverse pass through the tree, i.e. starting from the root towards the leaves, if a node parent has an "accept" status that means that the parent meets the attribute and alpha thresholds and it was the first one in its own root path. Thus all of its descendants including the referenced node, up until and including the tree leaves will inherit the parent node's ID. The segmentation routine labels all pixels as "True" (white pixels) if the leaf node that each associates to has a new node ID that is other than NULL implying rejection. All others are labeled as "False" (black pixels).

CCCP 103 may be used to extract the largest Alpha-Tree node along each root path that exists at a dissimilarity level that is greater than zero, i.e. it is not a leaf node, and less than or equal to a given alpha threshold, and satisfies a set of attribute constraints defined by the search being performed. CCCP may be used as is or tailored to handle the contents of anomalies detected by the Anomaly Discriminator of 112. In the latter case an additional constraint is added; that any —CC that retains its pre-assigned accept status cannot contain pixels of the background extracted from 111. Processing may begin by pre-accepting all tree nodes and setting the new ID value of each to the node's original numerical ID. Starting from the leaf-parent nodes at=1 and with lower than or equal to the alpha threshold, those that have an "accept" status and satisfy the attribute criteria are ignored. If a node is found within this range of alpha values that fails the attribute criteria, or contains background pixels, or if it has been rejected before (as a parent of a rejected child) it will be rejected, along with its own parent node. Once a node is rejected, this decision propagates to all its ancestors till the root node is reached. Nodes at alpha levels above the threshold may be automatically rejected.

In a reverse pass through an Alpha-Tree, i.e. from the root node to the leaves, if a node's parent has an "accept" status, the parent satisfies the attribute and spatial constrains, meets the attribute and alpha threshold and was the first largest such node in its own root path. In this pass, all of the node's descendants up to and including the tree leaves will inherit its own node ID. In the segmentation routine, all pixels may be labeled as the new ID of the leaf node that each associates to.

Figure 2:
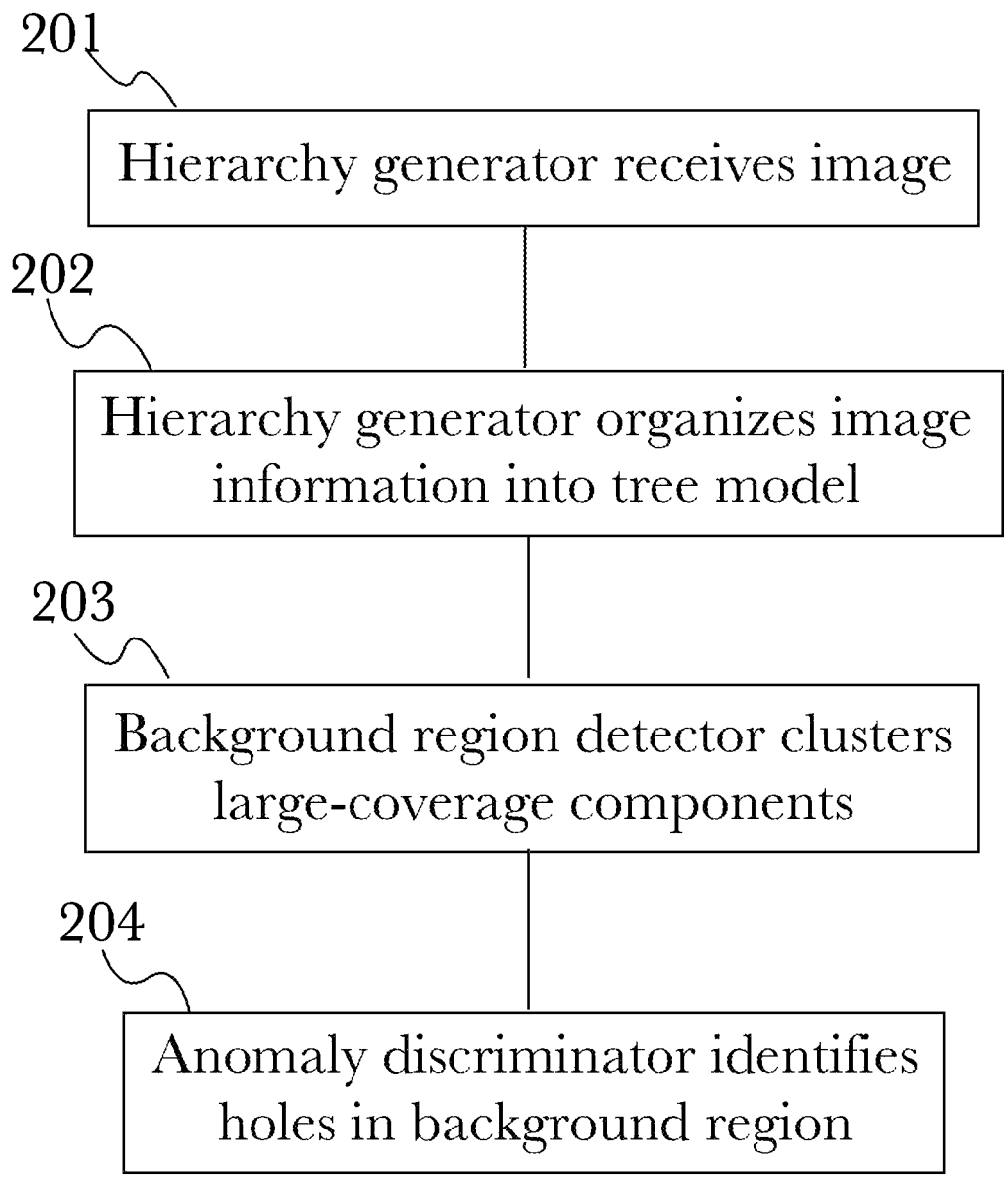
FIG. 2 is a flow diagram illustrating an exemplary method for anomaly detection using non-target clustering, according to one aspect.

FIG. 2 is a flow diagram illustrating an exemplary method 200 for anomaly detection using non-target clustering, according to one aspect. In an initial step 201, a hierarchy generator 102 receives an image, and then 202 organizes the image information into a hierarchy of fine to coarse alpha-connected components, to produce an alpha-tree (as described previously, referring to FIG. 1). In a next step 203, image components that sum up to some larger coverage component (above a certain size threshold) at a low dissimilarity threshold may be clustered and extracted by a background region detector 111. In a next step 204, an anomaly discriminator 112 may identify "holes" in the background region clusters, comprising sets of connected components that do not cluster with the larger background component unless a very high dissimilarity value is tolerated.

Detailed Description of Exemplary Aspects

Figure 3:
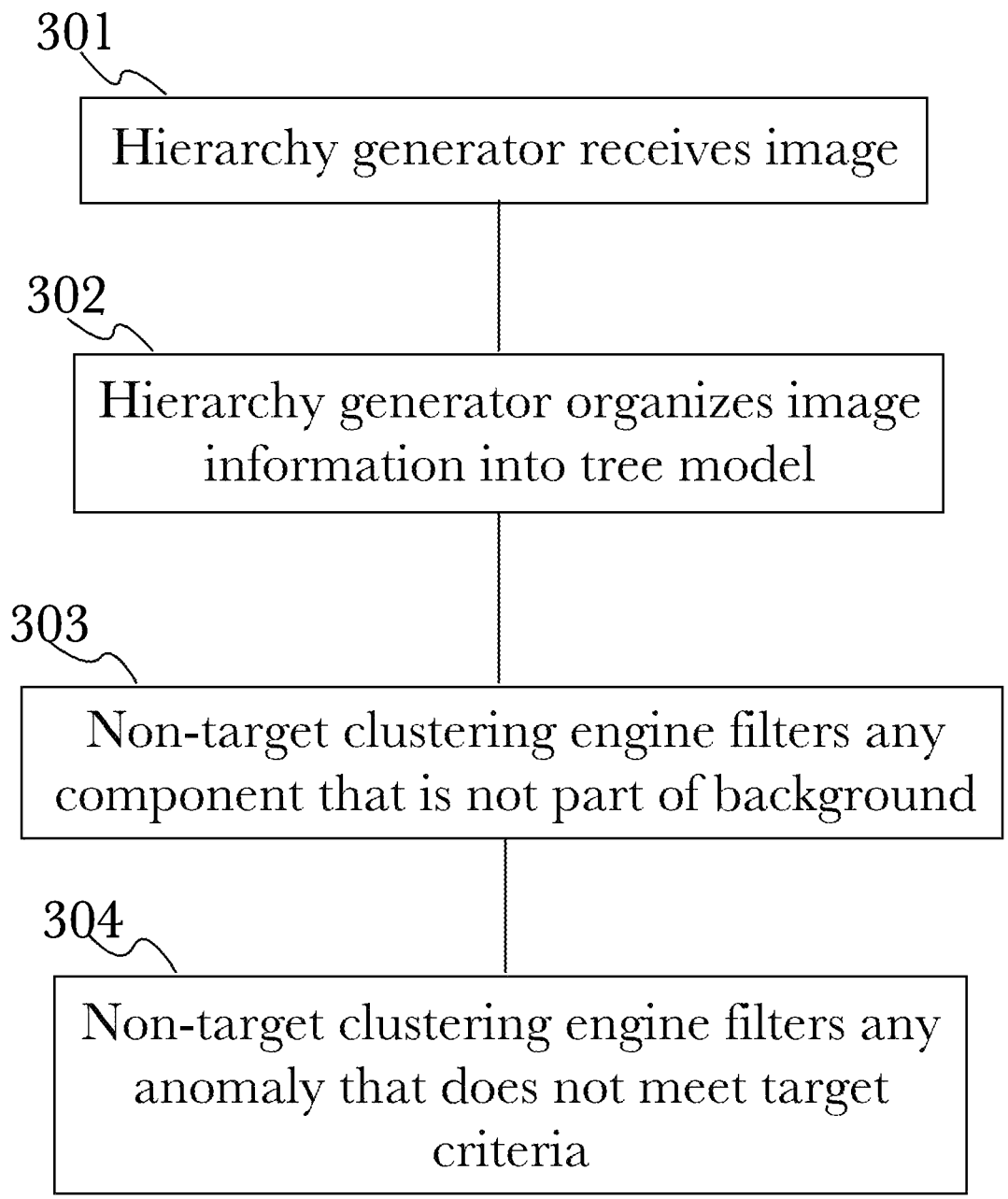
FIG. 3 is a flow diagram illustrating an exemplary method for anomaly detection using non-target clustering, according to one aspect.

FIG. 3 is a flow diagram illustrating an exemplary method 300 for anomaly processing following hole detection in 204. All background holes or anomalies are received in CCCP in 301. The contents of all holes are mapped into the leaf nodes of the Alpha-Tree as in 302. The CCCP is computed for the mapped nodes under the constraint of strictly no linkage to the background components 303. The Alpha-Tree filter then removes all alpha connected components, from within the holes, that do not agree with the target description 304.

Figure 4:
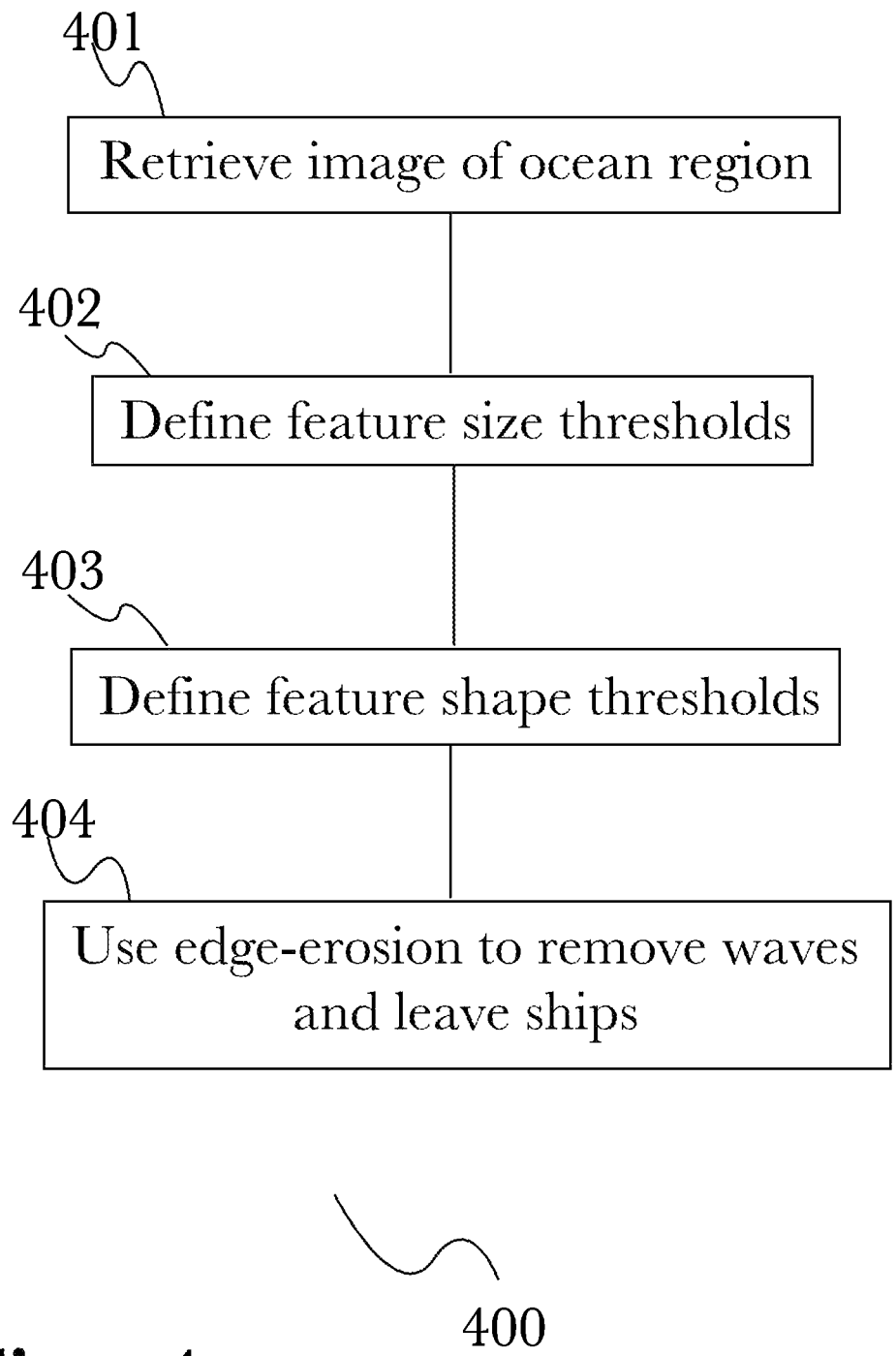
FIG. 4 is a flow diagram illustrating an exemplary method for ship detection using candidate anomaly analysis, according to one aspect.

FIG. 4 is a flow diagram illustrating an exemplary method 400 for ship detection using candidate anomaly analysis, according to one aspect. In an initial step 401, an image of an area of ocean or other large water body may be received and organized at a hierarchy generator 102. In a next step 402 and at the output of 110, size thresholds may be defined to set an upper limit on anomalies that are of interest (for example, a threshold slightly larger than the known maximum size of any ship), so that anomalies like clouds or land masses may be eliminated and only small anomalies in the ocean surface layer are extracted. In a next step 403, a shape definition may be defined, to exclude small anomalies that can be readily dismissed as they are not shaped like a ship (for example, rocks or small clouds). This may still leave some anomalies that are not ships, such as linear waves. To filter these anomalies, a greyscale copy of the input image is created 404 and processed using morphological erosion and conditional dilation operators reconstruction to fill in anomaly regions based on brightness and pixel radius definitions, removing any anomalies that are completely filled in. This final step eliminates waves but leaves ships, which have more complex visual features and more internal surface area between edges. The refined anomalies are then sourced into the CCCP in 103.

Figure 5:
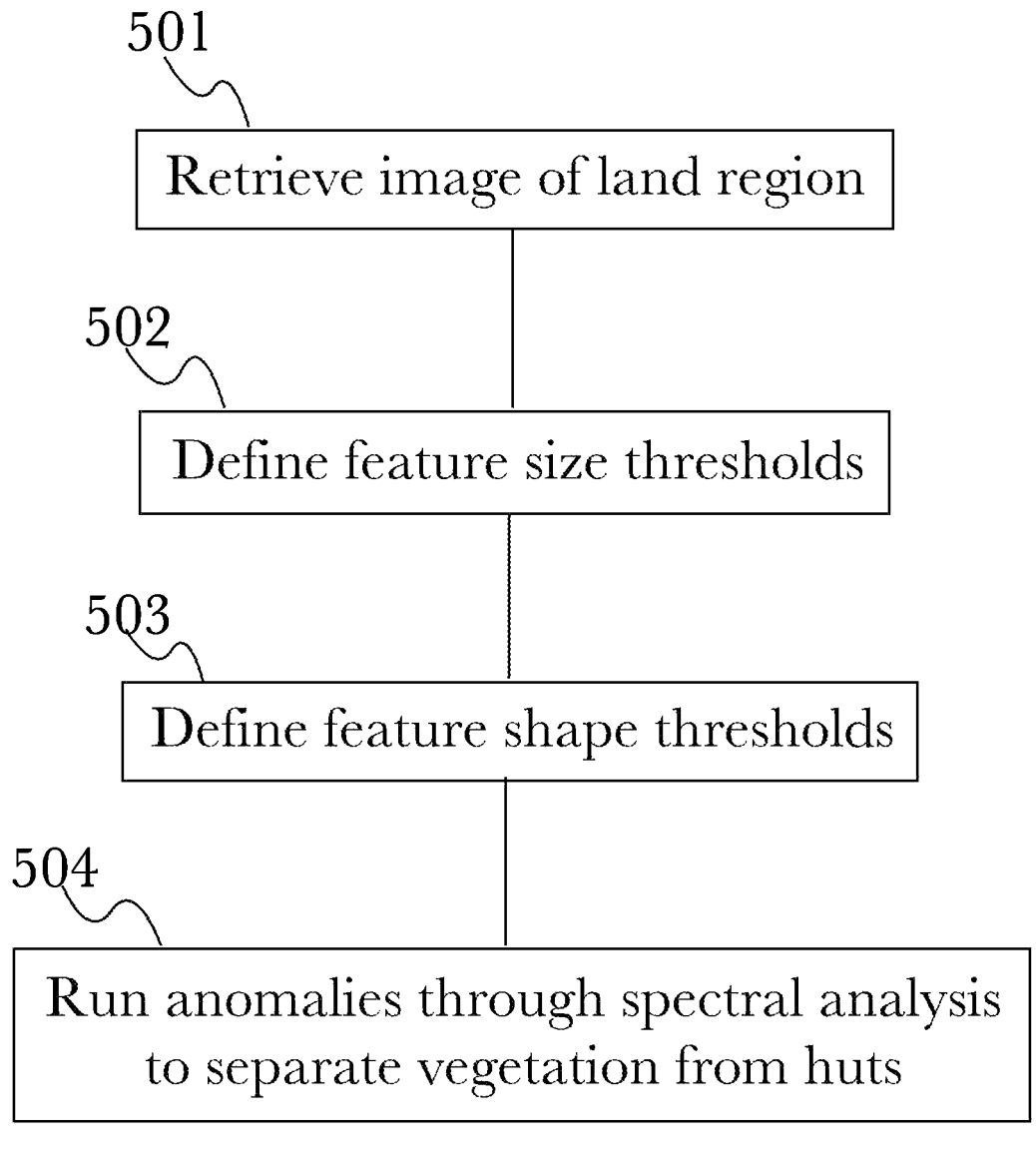
FIG. 5 is a flow diagram illustrating an exemplary method for hut detection using candidate anomaly analysis, according to one aspect.

FIG. 5 is a flow diagram illustrating an exemplary method 500 for hut detection using candidate anomaly analysis, according to one aspect. In an initial step 501, an image of an area of land may be received and organized at a hierarchy generator 102. In a next step 502 and at the output of 110, size thresholds may be defined to set an upper limit on anomalies that are of interest, to rule out large anomalies like lakes or forests and leave smaller anomalies including man-made huts and other structures. In a next step 503, a shape definition may be defined to exclude small anomalies that are not hut-shaped (generally disc-shaped when viewed from above), such as individual trees or other man-made structures. To filter out any remaining vegetation or rocks, a final step 504 may use multispectral analysis to remove anomalies that do not meet the expected spectral characteristics of a hut, for example using near-infrared (NIR) imaging to eliminate vegetation that is highly reflective in that spectral range. The refined anomalies are then sourced into the CCCP in 103.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
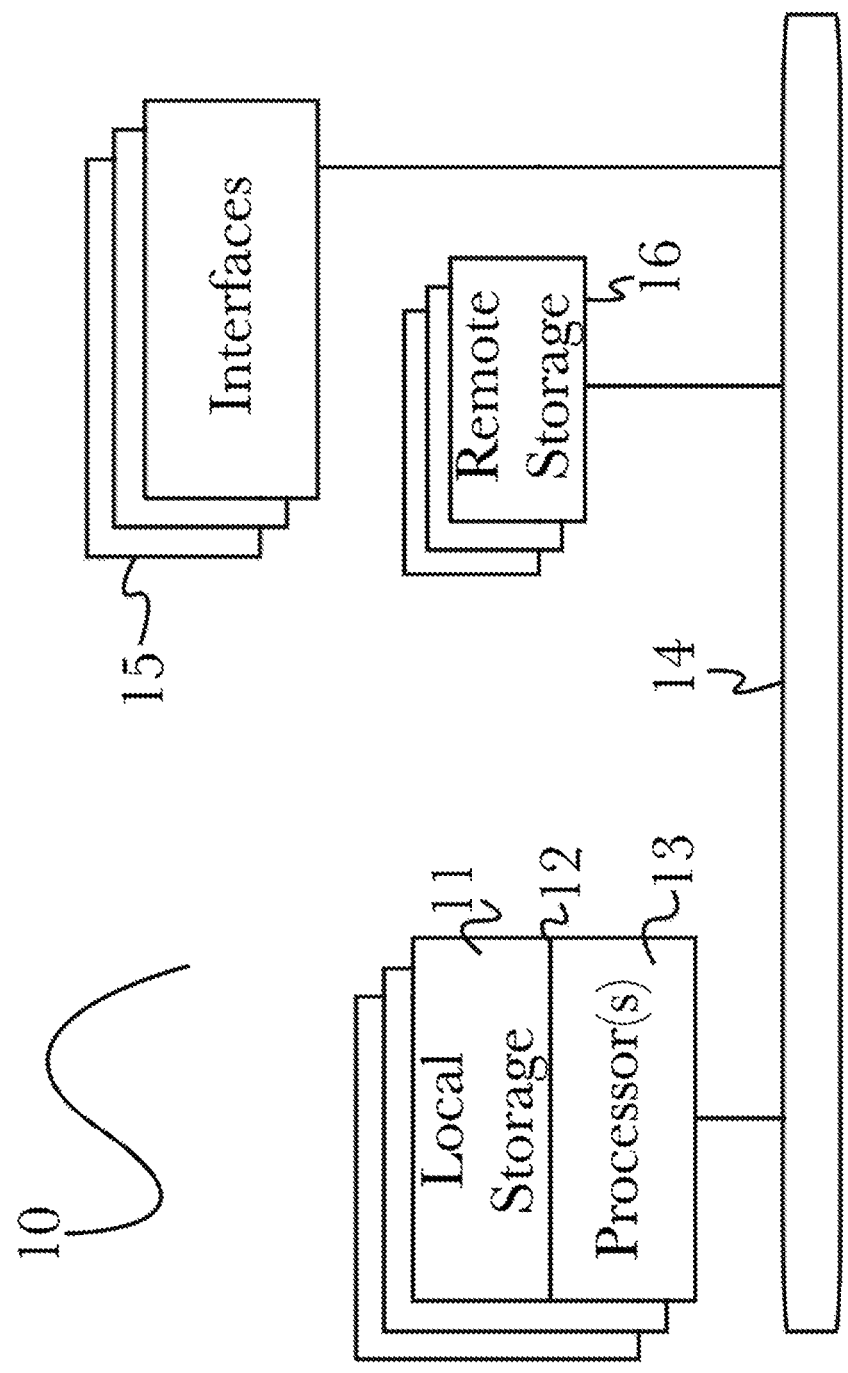
FIG. 6 is a block diagram illustrating an exemplary hardware architecture of a computing device used in an embodiment of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
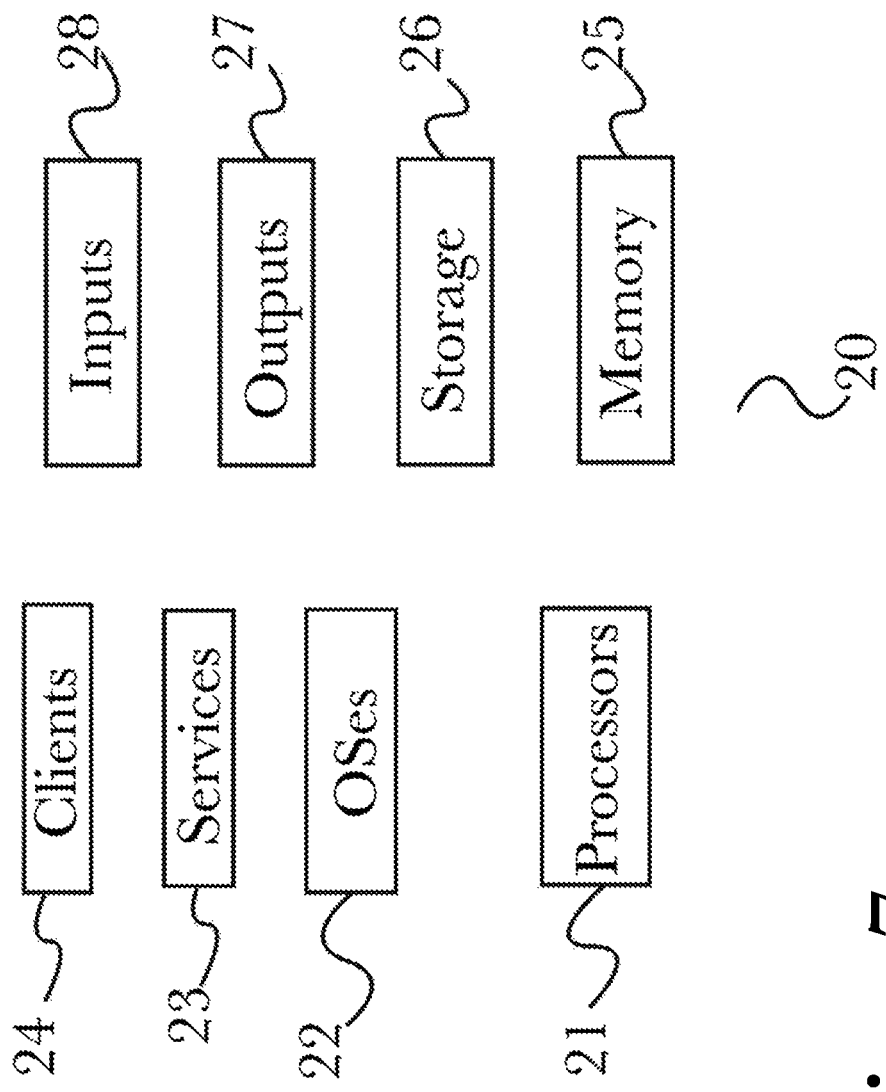
FIG. 7 is a block diagram illustrating an exemplary logical architecture for a client device, according to an embodiment of the invention.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
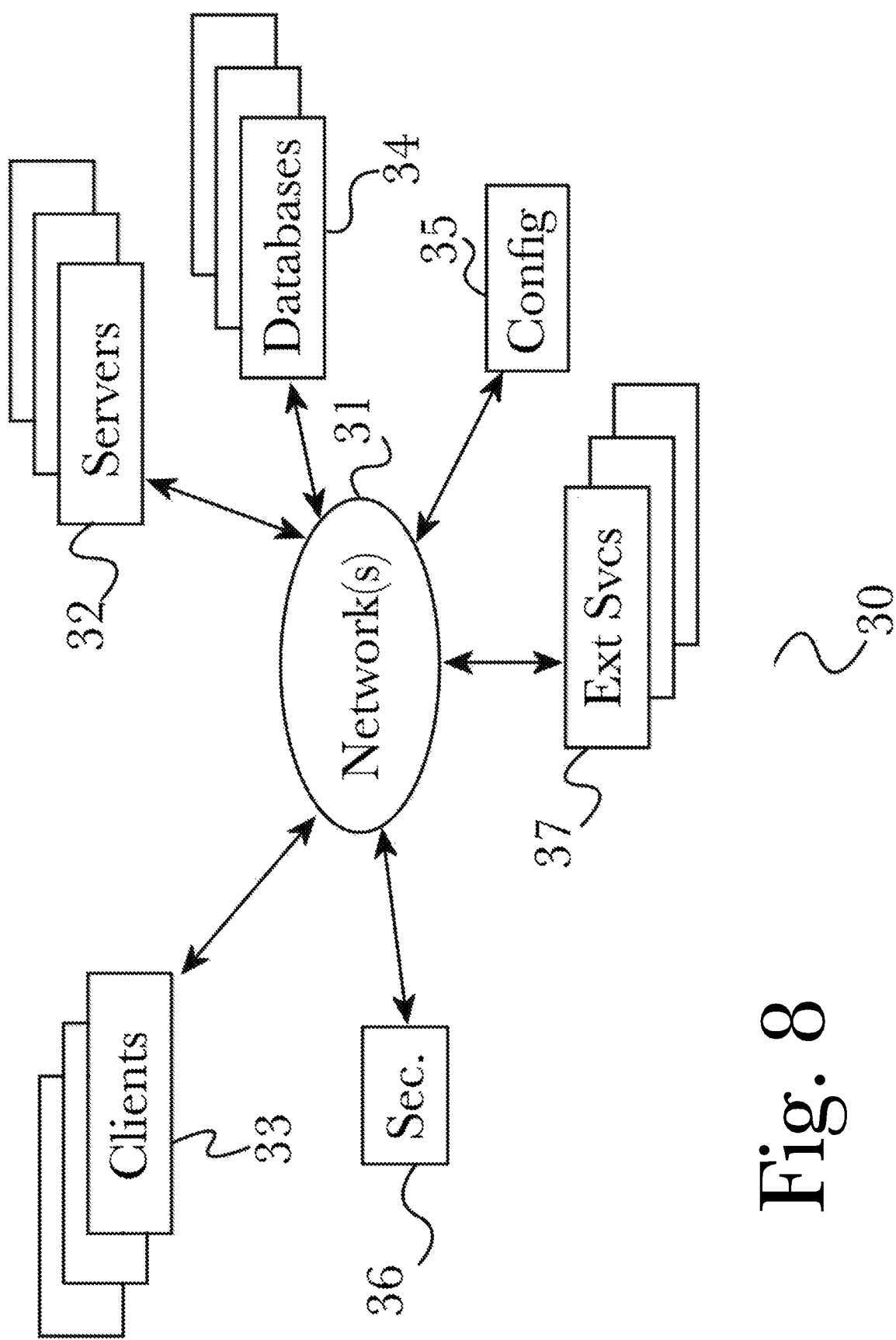
FIG. 8 is a block diagram showing an exemplary architectural arrangement of clients, servers, and external services, according to an embodiment of the invention.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
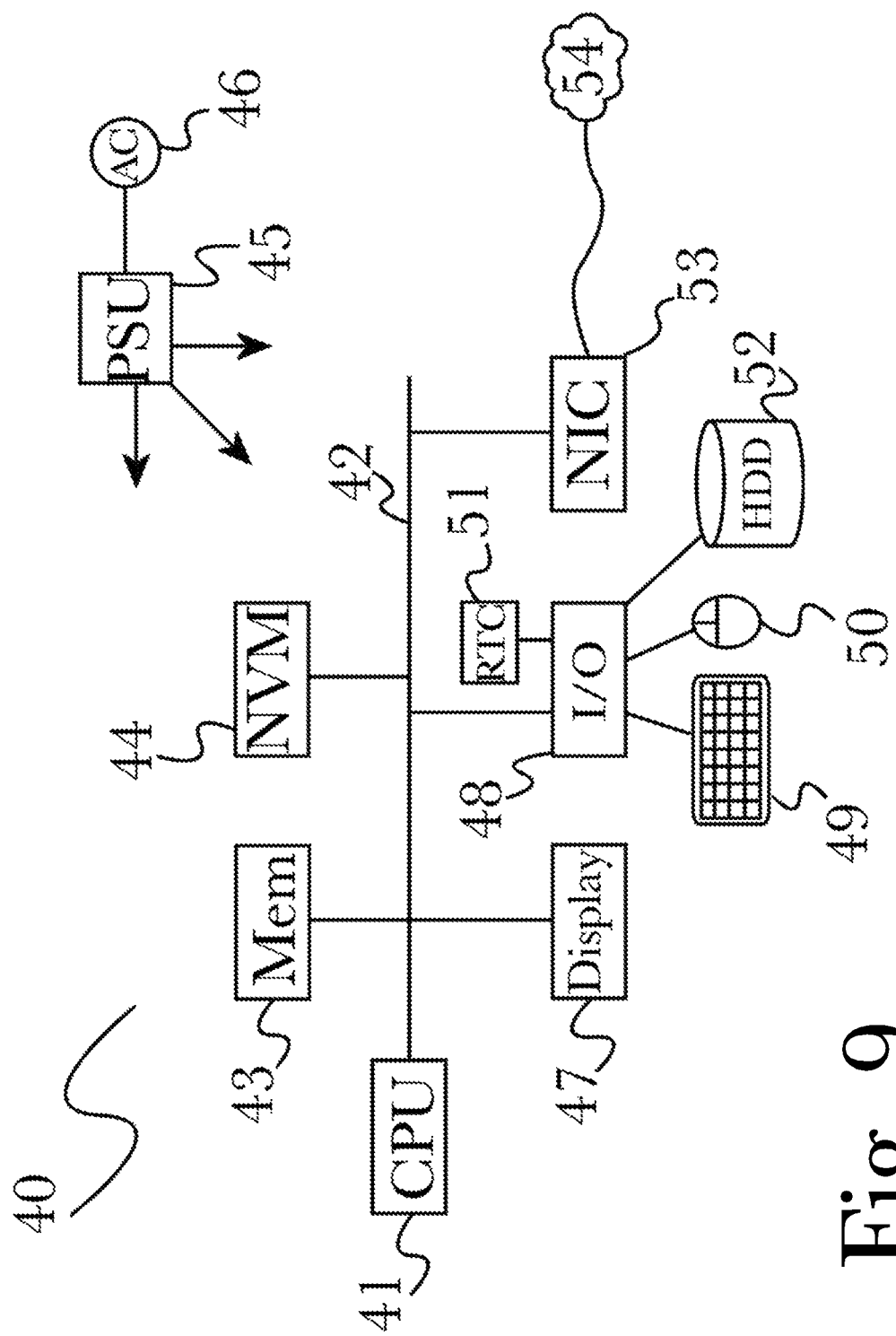
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for anomaly detection using non-target clustering, comprising:
   a hierarchy generator comprising at least a plurality of programming instructions stored in a memory and operating on a processor of a computing device and configured to receive an image and to algorithmically process the image to produce a hierarchical image model of image information within the image, the hierarchical model comprising a plurality of pixel groupings produced and organized using an alpha-tree modeling algorithm;
   a non-target clustering engine comprising at least a plurality of programming instructions stored in a memory and operating on a processor of a computing device and configured to process an image hierarchy to identify a background region and a plurality of anomalies, the anomalies being based at least in part on defined search criteria; and
   a constraint connected component processing engine comprising at least a plurality of programming instructions stored in a memory and operating on a processor of a computing device and configured to process the contents of detected anomalies to identify the targeted objects based on defined search criteria;
   wherein the alpha-tree modeling algorithm comprises a process for modeling pixel groupings within an image as hierarchically-nested image regions, the image regions being organized according to a dissimilarity metric.

2. The system of claim 1, wherein the background region is identified by analyzing large-coverage components of the alpha-tree model.

3. The system of claim 2, wherein the plurality of anomalies comprises at least a hole in the background region.

4. The system of claim 1, wherein the image comprises an ocean region.

5. The system of claim 4, wherein the background region comprises the ocean surface.

6. The system of claim 5, wherein edge erosion is applied to filter out waves in the ocean surface.

7. The system of claim 1, wherein the image comprises a land region.

8. The system of claim 7, wherein the background region comprises the land surface.

9. The system of claim 8, wherein spectral analysis is applied to filter out vegetation on the land surface.

10. A method for anomaly detection using non-target clustering, comprising the steps of:
    receiving, at a hierarchy generator, an image;
    processing the image using an alpha-tree modeling algorithm to produce a hierarchical model of image information within the image, the hierarchical model comprising a plurality of pixel groupings;
    processing, using a non-target clustering engine, the hierarchical image model to identify a background region and a plurality of anomalies, the anomalies being based at least in part on defined search criteria; and
    processing, using a constraint connected component processing engine, the contents of detected anomalies to identify the targeted objects based on defined search criteria;
    wherein the alpha-tree modeling algorithm comprises a process for modeling pixel groupings within an image as hierarchically-nested image regions, the image regions being organized according to a dissimilarity metric.

11. The method of claim 10, wherein the background region is identified by analyzing large-coverage components of the alpha-tree model.

12. The method of claim 11, wherein the plurality of anomalies comprises at least a hole in the background region.

13. The method of claim 10, wherein the image comprises an ocean region.

14. The method of claim 13, wherein the background region comprises the ocean surface.

15. The method of claim 14, wherein edge erosion is applied to filter out waves in the ocean surface.

16. The method of claim 10, wherein the image comprises a land region.

17. The method of claim 16, wherein the background region comprises the land surface.

18. The method of claim 17, wherein spectral analysis is applied to filter out vegetation on the land surface.

\* \* \* \* \*